Figure 1:
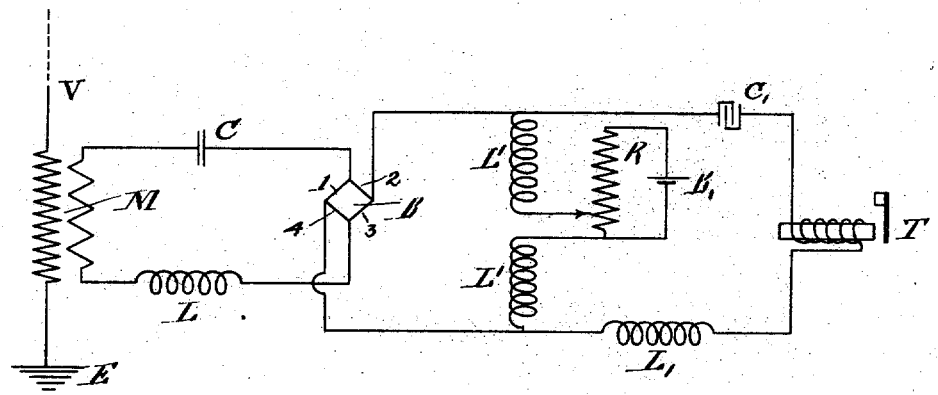

No. 768,001. PATENTED AUG. 16, 1904.
J. S. STONE.
SPACE TELEGRAPHY.
APPLICATION FILED FEB. 23, 1904.
NO MODEL. 2 SHEETS—SHEET 1.

WITNESSES
Brainerd T. Judkins
G. Adelaide Higgins.

INVENTOR
John Stone Stone
by Alex. P. Browne
attorney

No. 768,001. PATENTED AUG. 16, 1904.
J. S. STONE.
SPACE TELEGRAPHY.
APPLICATION FILED FEB. 23, 1904.
NO MODEL. 2 SHEETS—SHEET 2.

WITNESSES
Brainard T. Judkins
G. Adelaide Higgins

INVENTOR
John Stone Stone
by Alex. P. Browne,
attorney

No. 768,001. Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 768,001, dated August 16, 1904.

Application filed February 23, 1904. Serial No. 194,651. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

This invention relates to the art of transmitting intelligence from one station to another by means of electromagnetic waves without the use of wires to guide the waves to their destination; and it relates more particularly to systems for selectively receiving signals transmitted by such waves of predetermined electrical frequency and of predetermined group or wave-train frequency.

Systems for selectively receiving signals transmitted by electromagnetic waves of a predetermined group or wave-train frequency have long been well known. In most of these systems the selective agent is either a monotelephone or an electromagnet provided with a reed-armature attuned mechanically to the group or wave-train frequency of the waves by which the signals are transmitted. In some cases, however, it has been attempted to attune a local receiving-circuit by means of coils and condensers to such group or wave-train frequency; but I know of no case in which an operative system has been produced, because in every case, so far as I am aware, the condenser which forms one of the tuning elements of the local tuned receiving-circuit is included in series with the battery, the wave detector or receiver, and the signal-indicating device.

It is the object of my present invention to provide a space-telegraph receiving system in which a local receiving-circuit may be attuned electrically by capacity and inductance to a predetermined group or wave-train frequency, and such local receiving-circuit so attuned may with advantage be used in conjunction with a resonant circuit attuned to the electrical frequency of the waves the energy of which is to be received.

My invention may best be understood by having reference to the drawings which accompany and form a part of this specification and which illustrate diagrammatically four simple embodiments of my invention.

In the drawings, Figures 1, 2, 3, and 4 represent in diagram four forms of apparatus and circuit arrangements constituting space-telegraph receiving systems to which my invention has been applied.

In the figures, V is an elevated conductor. E is an earth connection. M is a transformer, preferably a step-down transformer. C $C_1$ are condensers. L $L_1$ are inductances. L' L' are impedances. L'' L'' are choking-coils. R is a resistance. $B_1$ is a battery. B B' are bolometers or other electroreceptive devices adapted to utilize in their operation the dissipative energy of the electrical oscillations developed in the circuits in which they are included.

T is a signal-indicating device, which may be a telephone or a monotelephone or an electromagnet whose reed-armature is attuned mechanically to the group or wave-train frequency of the electromagnetic waves, to the electrical frequency of which the resonant circuit M C B L is attuned to respond, being the group or wave-train frequency to which the local receiving-circuit B $C_1$ T $L_1$ is attuned. The circuits M C B L and M C B' L are resonant circuits attuned to the electrical frequency of the electromagnetic signal-waves the energy of which is to be received and adapted to absorb the energy of electrical oscillations of corresponding frequency to the practical exclusion of electrical oscillations of other frequencies. Such a selective receiving system has been described in my Letters Patent No. 714,756, dated December 2, 1902, to which reference may be had for a more complete description of the construction of parts and the mode of operation thereof than is necessary to set forth herein.

Figure 2:
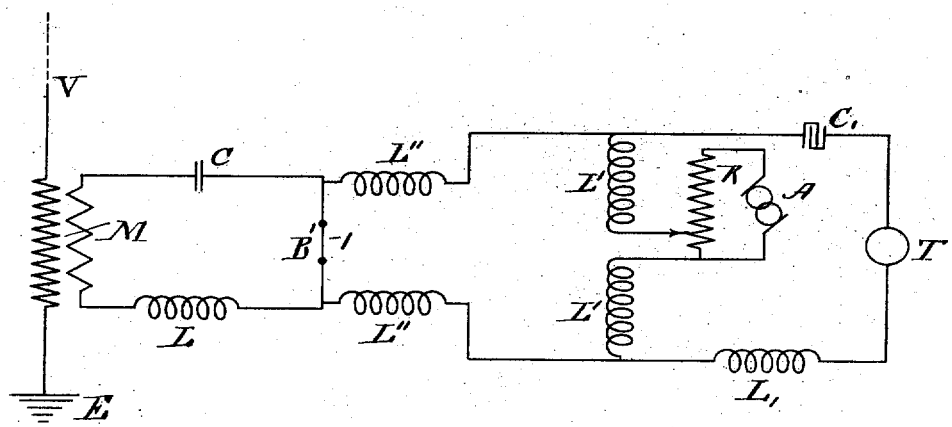
Figure 5:
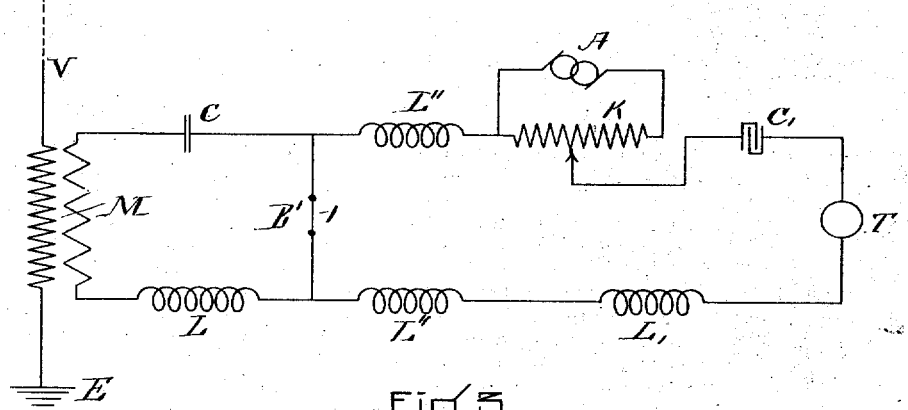

In Fig. 1 a bolometer B is shown serially connected in the resonant circuit M C B L, and inasmuch as the fine wires or strips 1 2 3 4 of said bolometer form a balanced Wheatstone's bridge the local receiving-circuit containing the signal-indicating device T may be connected directly to the equipotential points of this bridge; but in Figs. 2 and 3 the choking-coils L'' L'' are preferably included in the local receiving-circuit between the signal-indicating device T and the bolometer B', which in these cases consists of a single fine wire or strip 1.

In order to utilize the principle of group or wave-train frequency tuning, it is desirable that the wave detector or receiver employed be self-restoring, and although other forms of wave-detector of the coherer type may be used, as I have pointed out in my applications Serial Nos. 182,637 and 182,629, both filed November 25, 1903, I find it more advantageous to employ a receiver which utilizes in its operation the dissipative energy of the electrical oscillations developed in the circuit in which it is included, because such receivers are more sensitive and are more certain and reliable in their action than receivers of the coherer type.

Figure 4:
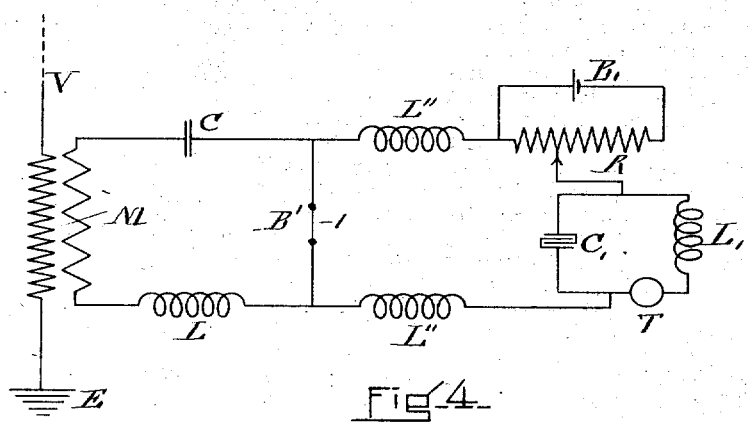

The circuits B $C_1$ T $L_1$ and B' $C_1$ T $L_1$ in Figs. 1, 2, and 3, respectively, and the circuit $C_1$ $L_1$ T in Fig. 4 are resonant circuits attuned to the group or wave-train frequency of the electromagnetic waves the energy of which the resonant circuit M C B L is designed to selectively receive.

The operation is as follows: When electromagnetic signal-waves, to the electrical frequency of which the resonant circuit M C B L is attuned, impinge upon the elevated conductor V, the said resonant circuit responds strongly to the resulting electrical oscillations, which are conveyed thereto by means of the transformer M, although, if desired, the elevated conductor may be conductively connected to said resonant circuit. The amplitude of these oscillations is greatly increased by the resonant circuit, and the dissipative resistance of the electroreceptive device B is varied by the energy of said oscillations. This variation in the dissipative resistance of the electroreceptive device B will be periodic and the number of variations per unit of time will be equal to the number of groups or wave-trains of electromagnetic waves developed in said unit of time at the distant transmitting-station. This periodic rate of variation in the dissipative resistance of the electroreceptive device B produces a corresponding rate of variation in the potential difference at the points where the impedances L' L' are connected with the circuit B $C_1$ T $L_1$, and if said circuit be attuned by the condenser $C_1$ and the coil $L_1$ or by other means to a frequency corresponding to such rate of variation a maximum current will be developed in said circuit and a maximum response of the telephone T will be effected.

It will be observed that the circuit L' L', containing the source of electromotive force $B_1$, is connected in parallel with the circuit B $C_1$ T $L_1$. If, however, the battery $B_1$ be included in series with the receiver B, condenser $C_1$, signal-indicating device T, and coil $L_1$, no amount of variation in the resistance of the receiver B will effect the slightest variation in the electromotive force in the battery $B_1$, and inasmuch as a condenser is not transparent to steady or unidirectional electric currents no current flow will be produced through the telephone T.

As indicated at A in Fig. 2, a source of rapidly-varying electromotive force may be employed, especially where the signal-indicating device T is not mechanically attuned. A continuous note is thereby produced in the telephone, and the variations in the resistance of the receiver B' will effect variations in this note. It is not necessary, however, when a source of rapidly-varying electromotive force is employed to connect this source to a circuit in parallel with the local resonant receiving-circuit B' $C_1$ T $L_1$, because in this case said source may be serially connected with the circuit, as indicated in Fig. 3, inasmuch as a condenser is transparent to rapidly-varying currents. In this case a certain portion of the rapidly-varying current will pass through the resonant circuit C M L B'; but inasmuch as the capacity of the condenser C is relatively small compared with the capacity of the condenser $C_1$ the greater portion of this current passes through the circuit B' $L_1$ T $C_1$, producing a continuous note in the telephone T, which note is varied when the resistance of the receiver B' is changed by the electrical oscillations absorbed by the circuit C M L B'.

In Fig. 4 the resonant loop-circuit $C_1$ $L_1$ T, attuned to a definite group or wave-train frequency, is serially included in a circuit containing the receiver B', the choking-coils, and a source of electromotive force. Here, again, if the circuit $C_1$ $L_1$ T be attuned to a frequency equal to the rate of variation of the resistance of the bolometer B' a maximum current is developed in said circuit and a maximum response of the signal-indicating device T is effected.

I claim—

1. In a space-telegraph receiving system, an electroreceptive device adapted to utilize in its operation the dissipative energy of the electrical oscillations developed in the circuit in which it is included, in combination with a local receiving-circuit attuned by capacity and inductance to the group or wave-train frequency of said electrical oscillations, and a signal-indicating device associated with said local receiving-circuit.

2. In a space-telegraph receiving system, an electroreceptive device adapted to utilize in its operation the dissipative energy of the electrical oscillations developed in the circuit in which it is included, in combination with a local receiving-circuit attuned by capacity and inductance to the group or wave-train frequency of said electrical oscillations, a signal-indicating device associated with said local receiving-circuit, and a source of electromotive force connected in parallel with said local receiving-circuit.

3. In a space-telegraph receiving system, an electroreceptive device adapted to utilize in its operation the dissipative energy of the electrical oscillations developed in the circuit in which it is included, in combination with a local receiving-circuit attuned by capacity and inductance to the group or wave-train frequency of said electrical oscillations, a signal-indicating device associated with said local receiving-circuit, and a source of rapidly-varying electromotive force operatively connected with said local receiving-circuit.

4. In a space-telegraph receiving system, an electroreceptive device adapted to utilize in its operation the dissipative energy of the electrical oscillations developed in the circuit in which it is included, in combination with a local receiving-circuit attuned by capacity and inductance to the group or wave-train frequency of said electrical oscillations, and a signal-indicating device mechanically attuned to said group or wave-train frequency associated with said local receiving-circuit.

5. In a space-telegraph receiving system, an elevated receiving-conductor, a resonant circuit associated therewith and attuned to the electrical frequency of the waves the energy of which is to be received, and an electroreceptive device adapted to utilize in its operation the dissipative energy of the electrical oscillations developed in said resonant circuit, in combination with a local receiving-circuit attuned by capacity and inductance to the group or wave-train frequency of said electromagnetic waves, and a signal-indicating device associated with said local receiving-circuit.

In testimony whereof I have hereunto subscribed my name this 16th day of February, 1904.

JOHN STONE STONE.

Witnesses:
BRAINERD T. JUDKINS,
G. ADELAIDE HIGGINS.

---

Correction in Letters Patent No. 768,001.

It is hereby certified that in Letters Patent No. 768,001, granted August 16, 1904, upon the application of John Stone Stone, of Cambridge, Massachusetts, for an improvement in "Space Telegraphy," an error appears in the printed specification requiring correction, as follows: In line 13, page 2, the numerals "182,637" should read *182,627;* and that said Letters Patent should be read with this correction therein that the same may conform to the record of the case in the Patent Office.

Signed and sealed this 11th day of July, A. D., 1905.

[SEAL.]

F. I. ALLEN,
*Commissioner of Patents.* receiving-circuit, and a source of electromotive force connected in parallel with said local receiving-circuit.

3. In a space-telegraph receiving system, an electroreceptive device adapted to utilize in its operation the dissipative energy of the electrical oscillations developed in the circuit in which it is included, in combination with a local receiving-circuit attuned by capacity and inductance to the group or wave-train frequency of said electrical oscillations, a signal-indicating device associated with said local receiving-circuit, and a source of rapidly-varying electromotive force operatively connected with said local receiving-circuit.

4. In a space-telegraph receiving system, an electroreceptive device adapted to utilize in its operation the dissipative energy of the electrical oscillations developed in the circuit in which it is included, in combination with a local receiving-circuit attuned by capacity and inductance to the group or wave-train frequency of said electrical oscillations, and a signal-indicating device mechanically attuned to said group or wave-train frequency associated with said local receiving-circuit.

5. In a space-telegraph receiving system, an elevated receiving-conductor, a resonant circuit associated therewith and attuned to the electrical frequency of the waves the energy of which is to be received, and an electroreceptive device adapted to utilize in its operation the dissipative energy of the electrical oscillations developed in said resonant circuit, in combination with a local receiving-circuit attuned by capacity and inductance to the group or wave-train frequency of said electromagnetic waves, and a signal-indicating device associated with said local receiving-circuit.

In testimony whereof I have hereunto subscribed my name this 16th day of February, 1904.

JOHN STONE STONE.

Witnesses:
BRAINERD T. JUDKINS,
G. ADELAIDE HIGGINS.

---

Correction in Letters Patent No. 768,001.

It is hereby certified that in Letters Patent No. 768,001, granted August 16, 1904, upon the application of John Stone Stone, of Cambridge, Massachusetts, for an improvement in "Space Telegraphy," an error appears in the printed specification requiring correction, as follows: In line 13, page 2, the numerals "182,637" should read *182,627;* and that said Letters Patent should be read with this correction therein that the same may conform to the record of the case in the Patent Office.

Signed and sealed this 11th day of July, A. D., 1905.

[SEAL.]

F. I. ALLEN,
*Commissioner of Patents.*

It is hereby certified that in Letters Patent No. 768,001, granted August 16, 1904, upon the application of John Stone Stone, of Cambridge, Massachusetts, for an improvement in "Space Telegraphy," an error appears in the printed specification requiring correction, as follows: In line 13, page 2, the numerals "182,637" should read *182,627;* and that said Letters Patent should be read with this correction therein that the same may conform to the record of the case in the Patent Office.

Signed and sealed this 11th day of July, A. D., 1905.

[SEAL.]

F. I. ALLEN,
*Commissioner of Patents.*